United States Patent [19]
Kuder et al.

[11] Patent Number: 5,754,725
[45] Date of Patent: May 19, 1998

[54] MULTIPLE FIBER CONNECTOR FOR INJECTION MOLDED MULTIPLE FIBEROPTIC COUPLER UNIT AND CLADDING FOR SAME

[75] Inventors: James E. Kuder, Fanwood; Kevin F. Manning, Annandale; Pascal J. B. Landi, Summit; Elizabeth E. Fernekess, Basking Ridge; Matthew Cardone, Belleville, all of N.J.

[73] Assignee: Hoechst Celanese Corp., Somerville, N.J.

[21] Appl. No.: 749,252

[22] Filed: Nov. 15, 1996

Related U.S. Application Data

[62] Division of Ser. No. 362,624, Dec. 22, 1994, Pat. No. 5,604,830.

[51] Int. Cl.$^6$ .................................. G02B 6/00; B05D 5/00
[52] U.S. Cl. ........................... 385/145; 385/143; 385/59; 385/71; 427/163.2
[58] Field of Search ............................ 385/141–145, 385/59; 427/162, 163.2, 393.5, 430.1

[56] References Cited

U.S. PATENT DOCUMENTS

| | | | |
|---|---|---|---|
| 5,052,776 | 10/1991 | Fukushima et al. | 385/120 |
| 5,578,669 | 11/1996 | Odawa et al. | 524/414 |

*Primary Examiner*—Phan T. H. Palmer
*Attorney, Agent, or Firm*—Hans-Perer Hoffmann

[57] ABSTRACT

The invention relates to multiple fiber connectors for thermoplastic optical couplers and fibers. The multiple-fiber connectors facilitate the connection of optical fibers to a star coupler and provide low levels of light loss between input/output ports of a coupler. The invention further relates to a terminator hot plate apparatus for the semiautomatic termination of optical fiber ends, and a new cladding material for thermoplastic optical couplers and fibers.

4 Claims, 6 Drawing Sheets

MULTIPLE FIBER CONNECTOR FOR INJECTION MOLDED MULTIPLE FIBEROPTIC COUPLER UNIT AND CLADDING FOR SAME

This application is a division of application Ser. No. 08/362,624 filed Dec. 22, 1994 which application is now U.S. Pat. No. 5,604,830.

TECHNICAL FIELD

The present invention relates to multiple-fiber connectors for thermoplastic fiber optical couplers and optical fibers, which provide a low-loss optical connection between the input/output ports of the coupler element and the fibers attached to it.

BACKGROUND OF THE INVENTION

Despite substantial improvements in the field, known optical signal couplers tend to have unacceptably high light losses, nonuniform signal distribution, or are bulky and inordinately difficult to fabricate. Many of these shortcomings such as misalignment of the fibers, result from the connectors used to join the coupler to optical fibers.

U.S. Pat. No. 5,255,336 discloses an injection molded optical element, having molded optical junctions with an integrally formed input or output portion projecting outwardly from the coupler body defining an angle with a propagation axis of the element, and a continuous waveguiding profile free from lateral discontinuities. The molded coupler and housing disclosed in U.S. Pat. No. 5,255,336, are specifically designed to adapt to DNP (Dry No Polish) connectors from AMP, Inc. and thus, the molded coupler is not compatible with any other type of connector, since the ends of the fibers of the coupler are molded at a distance from one another to allow a DNP connector to be attached to each fiber without forcing the fibers from coplanarity.

The prior art process used to connect the fourteen individual fibers to the 7×7 type molded coupler disclosed in U.S. Pat. No. 5,255,366, is also time consuming and may result in variability in optical loss at each fiber. The fiber ends on the coupler are connected with DNP connectors which are specifically designed to connect jacketed fibers. This results in light losses result since absorption of the evanescent wave energy by the black jacketing material can result in a decrease in the amount of light emerging from each fiber end.

The existing mechanism for terminating the fibers involves manually pressing the ends of each of the individual fibers onto a highly polished hot plate which produces a relative low optical loss connection. Manual termination of the fiber ends of a coupler may also result in increased excess loss and loss of uniformity. The present invention concerns improved connectors and related methods of making and using the same which improve on the shortcomings of the prior art.

SUMMARY OF THE INVENTION

The invention relates to a thermoplastic optical coupler connector for joining a multiple fiber injection molded optical coupler and optical fibers. The connector comprises a pair of a multiple-fiber "multi-pin" connecting blocks. The first block is attached at one of the end of an optical coupler element and a second matching block is joined to the ends of each of the fibers to be connected to the coupler. The connecting blocks are rectangular in shape with a plurality of input/output ports arranged therein. Each of the identical connector blocks has a flat surface facing the optical element or fibers and a partially contoured connecting surface which faces the opposed connecting block within a housing. The connecting surface has a recessed central area which is slightly oval in configuration and, which houses and holds the fiber ends to be connected in place. The connecting surfaces of the pair of blocks in the connector oppose one another and are fully in contact when the optical coupler and the optical fibers are connected.

The plurality of input/output ports or openings in the connecting block are equally and uniformly spaced from one another and centered along the length of the block along the same plane within the recessed area. The fibers to be connected protrude through the ports to form a horizontal row in the middle of the block. Each fiber end of the coupler element or fibers to be connected is placed through a corresponding opening in the block so that the connecting block holds the fibers together in a single unit when all of the connector parts are engaged.

The coupler connector in addition to the blocks also comprises a molded plastic housing which encloses and secures the connecting blocks in place. The optical fiber connector of the invention can be injection molded from thermoplastics such as polymethylmethacrylate (PMMA) and polycarbonate.

In order to limit light loss the ends of the optical coupler and fibers may be thermally terminated in each corresponding connecting block in a single step using a terminator hot plate apparatus in order to produce an optically smooth connection. The invention also provides a terminator hot plate apparatus and system for use with the polymer optical coupler connectors and optical fibers which facilitates the process of coupling the elements and fibers with the connectors.

In another embodiment, the invention concerns a polyacrylic cladding material for thermoplastic optical couplers and fibers, and a method for applying the polyacrylic emulsion to optical couplers and fibers.

DETAILED DESCRIPTION OF THE INVENTION

The invention is described in detail hereinafter in connection with several embodiments which exemplification is for purposes of illustration only.

The multiple fiber optical coupler connector of the invention is of compact dimensions and allows the attachment of optical fibers to an optical coupler so that they can easily be integrated into a fiberoptic system. For example, the connectors of the invention can be used to connect polymer optical fibers to the injection molded optical element of the coupler unit described in U.S. Pat. No. 5,255,336, the disclosure of which is herein incorporated by reference. The optical coupler element units are provided with multiple fiber connectors which are made from a thermoplastic polymer. Typical preferred polymers include optical grades of polymethylmethacrylate and polycarbonate such as those grades used to make compact disks.

The connector of the invention comprises two rectangular blocks and a housing which comprises an upper and a lower fastening cover. Each block is slightly rounded at the ends having a plurality of input/output ports arranged in the block so as to form a horizontal row at the center along the length of the block. Each port is configured and dimensioned so as to hold and engage the input/output fibers of the optical element or the ends of the optical fibers to which it will be connected in place. In one embodiment, the connectors are used with 7×7 star couplers and thus each connector contains seven (7) ports aligned along the center access and equally spaced throughout. Each port comprises a hole or bore through the connector block and is configured and dimensioned to engage and securely hold a polymer optical fiber. The cross-sectional dimensions of the ports must be configured so as to match those of the fibers to be used with the coupler and may be cylindrical or square in cross-section, or square which transition to cylindrical at the ends toward the connecting surface.

Figure 1:
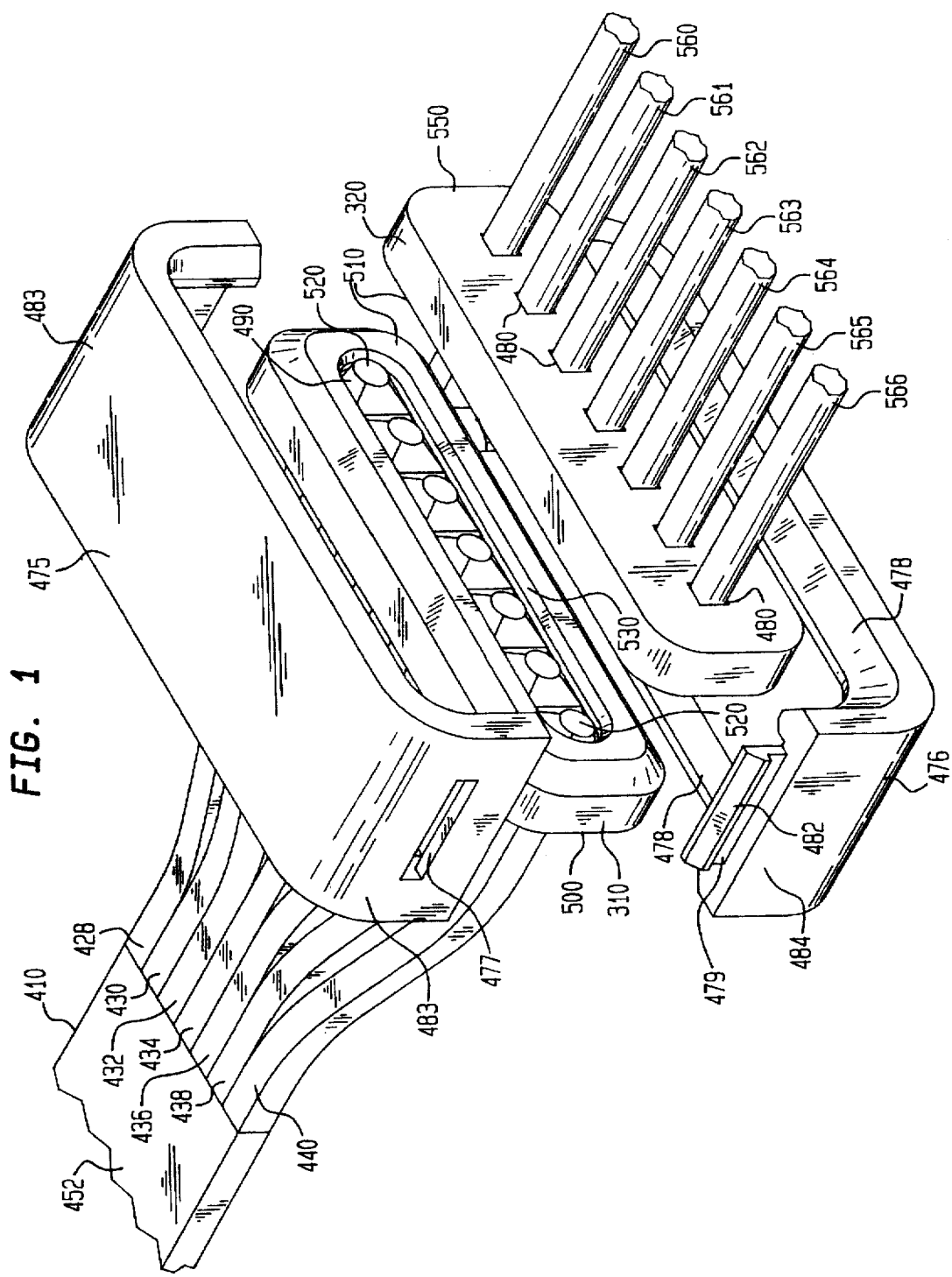
FIG. 1 is a plan view of a multiple fiber connector of the invention, showing connection to fibers and to an optical coupler element via the connecting blocks and housing.

Referring to FIG. 1, a multiple-fiber connector according to one embodiment of the invention is depicted connecting the fiber ends, 428–440 of a 7×7 star coupler 452, in which the fibers 428 through 440 of the coupler element are shown connected to seven (7) different optical fibers 560–566. The thermoplastic connector as shown in FIG. 1 comprises a first connecting block 310, a second connecting block 320 and a housing 475, 476. The block 310 is attached to an optical coupler element having a plurality of fiber input/output ports 428–440, and illustrated in the figure as 7 fibers. Block 310 further has multiple bores which traverse the width of the block and end in the connecting surface 490 equally and uniformly spaced from one another and centered along the length of the block. Each opening 490 in the block is configured and dimensioned to hold an optical fiber end of an optical element thereby immobilizing the optical element 410. The cross-sectional dimensions or diameter of the openings may vary depending on the diameter of the fibers to be connected; and may be in diameter range from about 0.2 to about 5 mm. In a preferred embodiment, the diameter of the openings is 1 mm and the preferred spacing between the ports is 0.1 mm.

The connecting block 310 further comprises a flat, insertion surface 500 facing the optical elements or fibers and a connecting surface 510. The connecting surface 510 contains a recessed area which may be oval in shape 530 within which the openings are positioned so that the fiber ends 520 slightly protrude through the openings and extend from the connecting surface, but not beyond the width of the block. In preferred embodiments of the invention the recessed area further comprises a supporting structure 530 integral to the block and which are surrounding each of the holes from which the fiber end protrudes. The connecting surface 510 of the block attached to the optical coupler, faces and contacts the connecting surface 510 of block 320 connected to the optical fibers 560–566 when the connector is engaged.

The other connecting block 320 of the connector is attached to a plurality of optical fiber ends 560–566 which are connected to the coupler element. The blocks 320, and 310 may be interchangeable and are referred to separately here solely for purposes of illustration. Block 320 engages the same number of fibers as the fiber leads of the coupler to be connected, and is configured and dimensioned to match the corresponding block connected to the coupler element so that when the connector blocks are enclosed in the housing, the fiber ends of the optical fibers and the coupler element are aligned and opposed to each other so as to permit the transmission of light with a minimal loss. Block 320 also contains openings 480 equally and uniformly spaced from one another and centered along the length of block. Each opening in block 320 is configured and dimensioned to hold the ends of the optical fibers so that the fiber ends are immobilized and aligned in a horizontal plane and contact the ends of the opposed fibers engaged by the other connecting block. Block 320 also has a flat surface 550 which faces the fibers and a connecting surface having a recessed area surrounding said openings so that the fiber ends slightly protrude through the openings extending, but not protruding the width of the block.

FIG. 1 also illustrates one embodiment of the connector housing, comprising an upper 475 and a lower cover 476, which hold and fasten the connecting blocks 310 and 320 in place. The covers 475 and 476 further immobilize and protect the optical coupler element and fibers so that corresponding fiber ends 520 of the optical coupler element and optical fibers are respectively, in full contact and aligned.

In a preferred embodiment the upper cover 475 is a flat rectangular-shaped structure, with slightly rounded corners and downturned sides as shown 483. Each side of the upper cover 475 further comprises a means for engaging the lower cover such as, a rectangular opening 477 along the side for engaging the engagement means on the lower cover 476. The lower cover 476 is also flattened and rectangular in shape, having the ends curved upwardly and terminated by engagement means for the upper cover, for example, by ridges 484, which engage with the rectangular openings 477 of the upper cover 475. In a preferred embodiment, the ends of each side of the lower cover further comprise short rectangular upward projections 479 for engaging with the upper cover 475. The projection 479 further comprise engagement means which in one embodiment are lips 482 which extend laterally, and are configured to fit and engage with the upper cover openings 477 forming a seal to securely engage the upper and lower covers, thus immobilizing the connecting blocks 310, 320. The upper and lower covers 475, 476 may further comprise raised areas or lips 478 positioned along the edges of the covers facing the connecting blocks 310, 320 so that the connecting blocks fit securely and are prevented from sliding within the housing.

Figure 2:
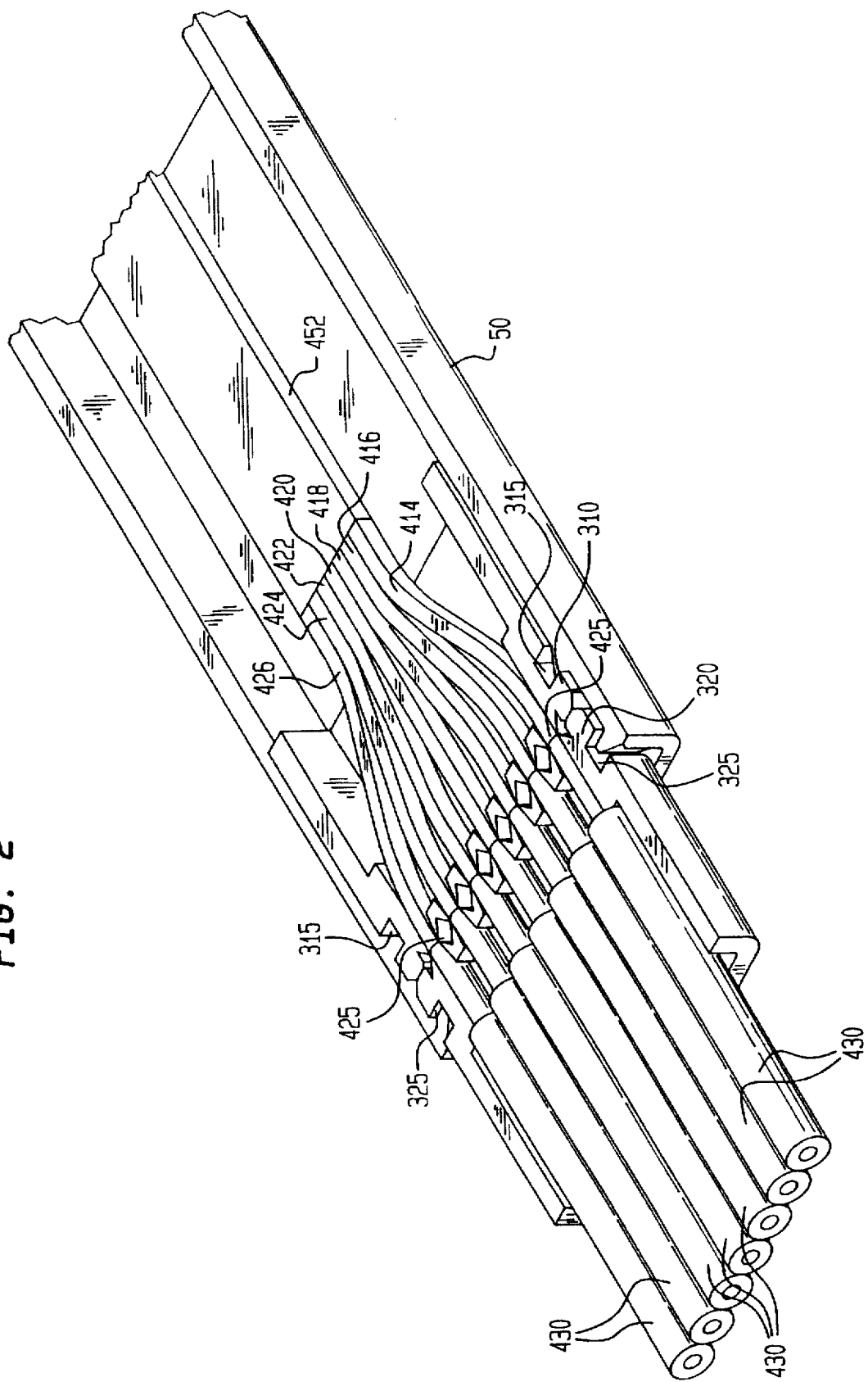
FIG. 2 is a cross-section of an optical coupler and fiber pigtail connected using a connector of the invention.

FIG. 2 is a cross-section of another embodiment of a coupler connector housing according to the invention. Referring to FIG. 2 each input/output port 414 through 426 has a circular cross section at its terminus 425. A fiber pigtail with cladding 430 is shown connected to a coupler element 452. Fiber ends of the optical coupler element 414–426 and optical fibers 430 are housed within the openings traversing the connecting blocks 310 and 320. The ends of the fibers may be anchored through the openings with a dab of UV-curable epoxy, thereby further immobilizing the optical element 452 and fibers 430 in place.

In the embodiment illustrated in FIG. 2, each connecting block 310, 320 has a groove 315, 325 around its entire perimeter for engaging the corresponding raised ridges on the inner surface of the housing 50 for immobilizing the connecting blocks.

In this embodiment of the invention, the housing cover 50 encloses the entire coupler element and is used to connect the connecting blocks on both ends of a coupler element. While, the housing is designed to house and protect the entire coupler unit the principles of operation in engaging and aligning the fibers are the same as those described for the other embodiments above.

Figure 3:
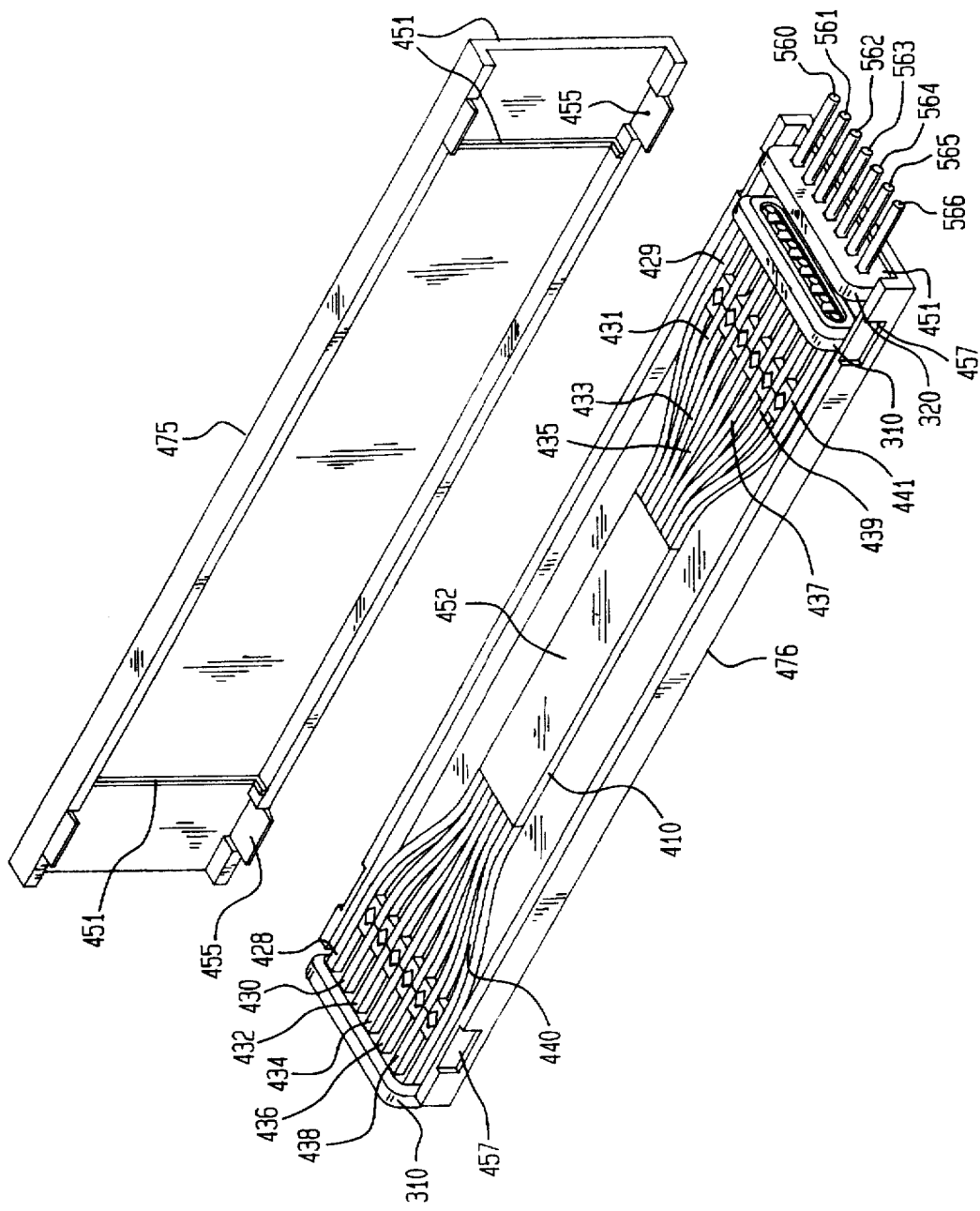
FIG. 3 depicts a perspective view of a 7×7 star coupler and the connecting blocks of the invention and its housing.

FIG. 3 specifically illustrates another particular embodiment of the invention wherein a 7×7 star coupler element 452 has short input/output fibers 428–441, and is provided with connector engaged by a housing having fastening means as described in FIG. 1 above, however, the housing spans the entire coupler element, and secures the connecting blocks at both ends of the coupler as in FIG. 2. The ends of the fibers, such as, fibers 428–441 and 560–566 are fitted with connecting blocks 310, 320, which fit securely into covers 475, 476 in the space between the inner projections or ridges 451. Ridges 451 at either end of the housing immobilize the blocks positioned between them, and thereby the element 452 and fibers 560–566. A snap means for securing the upper and lower covers is shown as projections 455 in upper cover 475 and openings 457 in lower cover 476.

In one embodiment, the connector is provided with optical gel to further reduce excess loss. The multiple fiber connectors of the invention provide an optical coupler with a low level of light loss at the connection between the input/output ports of the coupler element and the fibers attached to it. The multiple-fiber connectors have an additional advantage in that they are small and compact and thus, they reduce the size of the coupler device by a factor of two in length and width over those of the prior art.

The invention further provides a means to achieve uniformity of the surface of the fiber ends and to make the process for terminating the fibers to be connected more efficient. This inventive single step process is described in detail in the following paragraphs.

The coupler element is assembled with its connector blocks at each end and immobilized in a terminator hot plate apparatus as illustrated in FIG. 4A. The fiber ends of the coupler which would normally protrude to approximately 3 mm from the connecting block are trimmed with a sharp blade to 1 mm from the end of the connecting surface.

The fibers are thermally terminated by mechanically pressing the optically smooth and polished surfaces of two heating elements or hot plates of the terminator apparatus against each end of the immobilized coupler element, so that the heat melts the ends of the fibers when the hot plates contact the fibers. The application of hot plates, which are at a sufficient temperature to melt the thermoplastic polymer used, melts the fiber ends so as to produce a smooth surface on each of the fibers and fuse the ends of the fibers to the connecting block. The thermal melting of the fiber ends also minimizes roughness at the surface which functionally minimize light loss at the gate during operation.

Thus, the method for connecting an optical coupler element and optical fibers or optical fiber pigtails using the connector of the invention is simplified by the use of the terminator apparatus. The connecting blocks are placed on each end of the optical coupler element so that the fibers slightly protrude through the openings, and then are immobilized in a positioning fixture of a terminator hot plate apparatus. The fibers are terminated by the application of an optically smooth heated surface of the hot plates of the terminator apparatus, thus melting the surface of the protruding ends of the fibers at each end of the coupler element so that they are smooth and uniform in length. The same procedure is followed for the second connecting block engaging the optical fibers to be connected to the optical coupler element. Both connectors are then assembled in the housing so that the coupler and the fibers are fastened and secured within the housing and the fiber ends of the optical coupler element and fibers are aligned and contact one another.

The terminator hot plate apparatus of the invention provides the ends of the input and output ports and fibers with surfaces which functionally produce relatively low loss of light during connection of the coupler to optical fibers with multiple fiber connectors. The terminator apparatus allows for a semiautomatic termination process in a reproducible and uniform manner thus reducing the time spent during assembly of the connector device.

Figure 4:
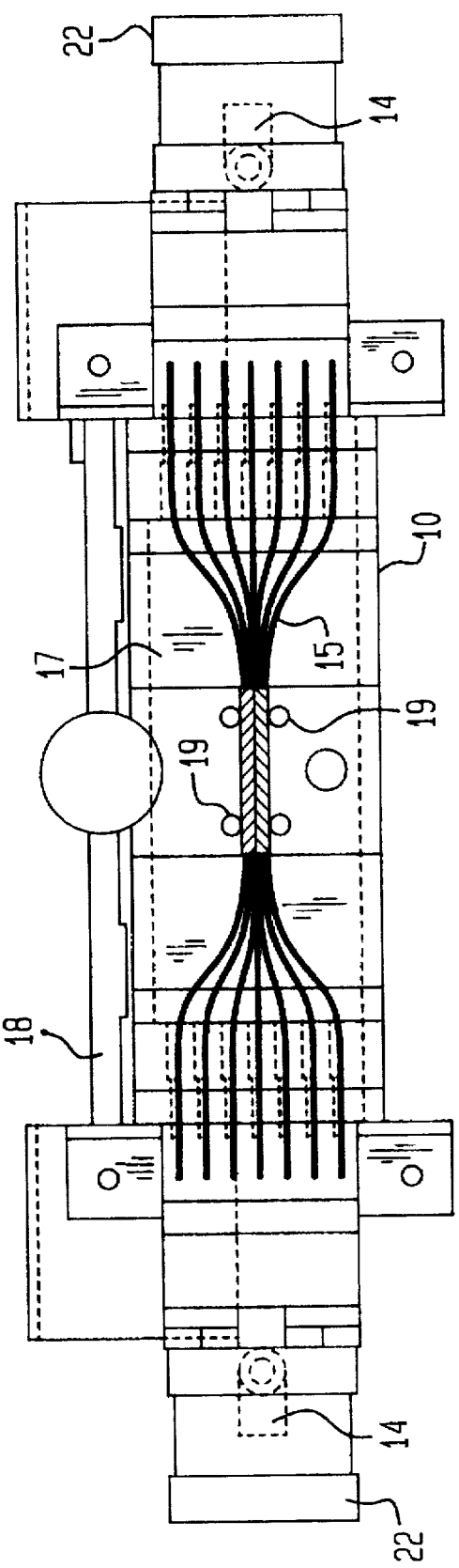
FIG. 4 depicts a view from above of the terminator hot plate apparatus of the invention with a coupler element in place.
Figure 5:
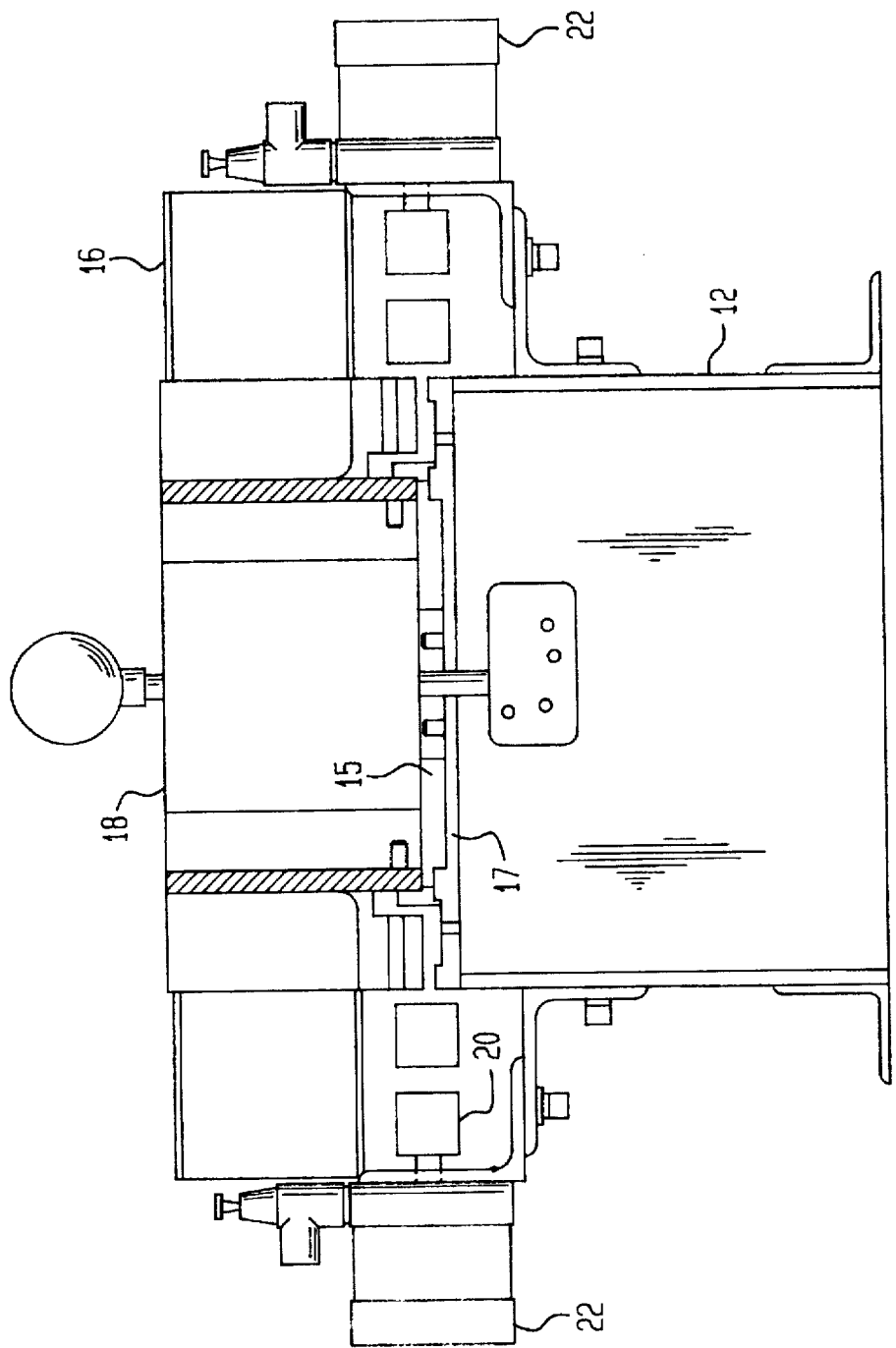
FIG. 5 depicts a frontal view of the terminator hot plate apparatus of the invention.
Figure 6B:
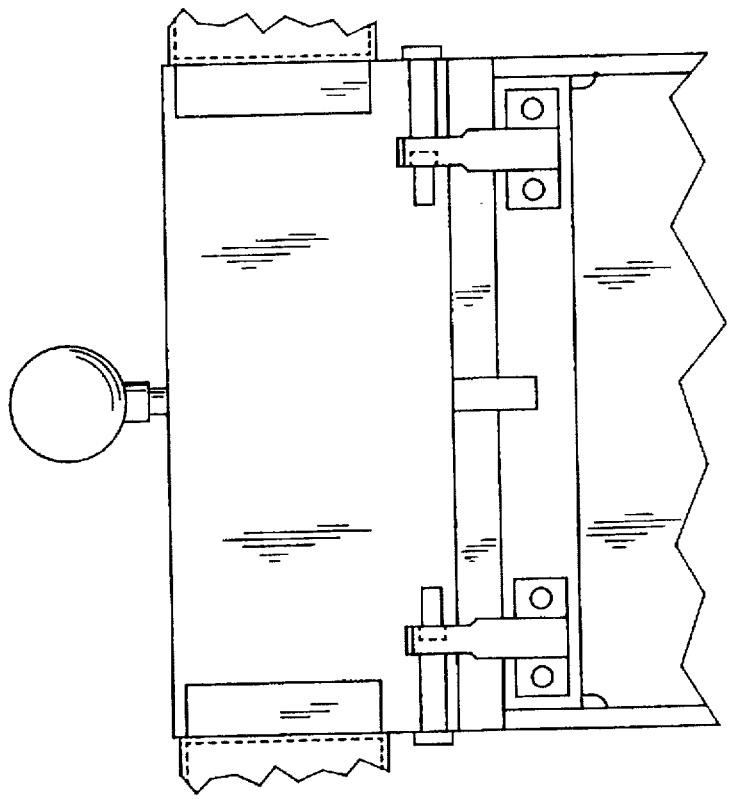
FIG. 6 depicts lateral A, and frontal views of the terminator hot plate apparatus of the invention.
Figure 6A:
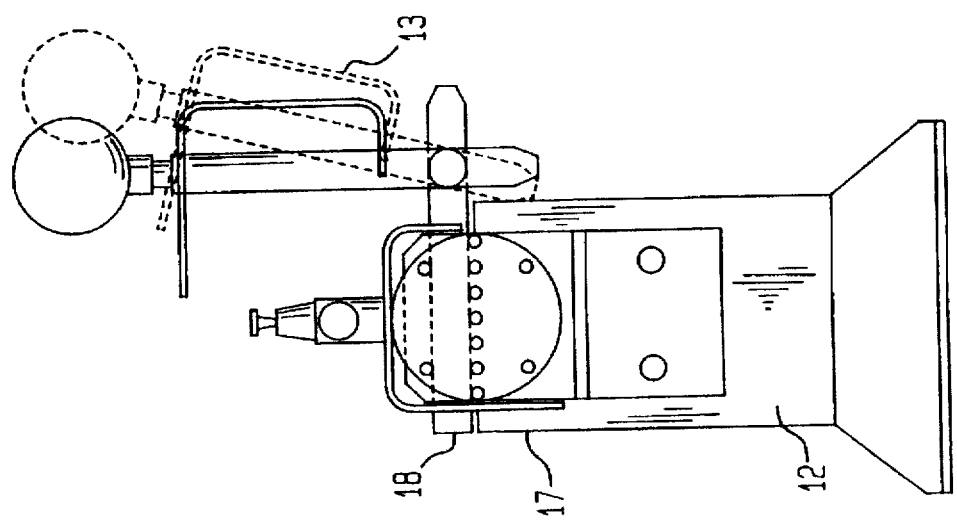

The terminator hot plate apparatus of the invention which is illustrated in FIG. 4–6, comprises a base 12 which is preferably rectangular in shape. A rectangular platform 17 is attached to the top of base 12 and contains a positioning fixture 10, configured and dimensioned to engage and immobilize a coupler, such as coupler element 15 with AMP, DNP connectors in place FIG. 4. The positioning fixture 10 has a plurality of pins 19 for stabilizing a coupler with connectors and fibers. A movable lever 13 is attached to the fixture by the cover. When the lever 13 is actuated as illustrated in FIG. 6A, the coupler is secured by the cover in the positioning fixture 10.

The apparatus further comprises means for controlling the temperature settings, piston movements, and duration of heating of the plates. The means for moving the pistons, in one embodiment is, two air cylinders 22, each containing a movable piston 14. Each piston is attached at each side of the base 12 so that both sides of an optical coupler with connectors are simultaneously worked on. The air cylinders 22 are provided with an electrical system controlled by a solenoid valve. Each cylinder 22 houses and drives the piston 14, which is attached to a heating element for heating the hot plate 20 connected to the end of each piston 14. The apparatus further comprises a movable cover 18 attached to base 12, for further immobilizing the coupler with connectors in the positioning fixture. The cover 18 has two ends and at each end a shield 16 is attached, which covers the area over the hot plates 20. The cover 18 can be moved to an open or closed position by means of a clamp or hinge, which is attached to a movable lever 13 described above.

The hot plates 20 of the device have a highly polished, mirror surface facing the platform for contacting the fibers to be terminated. The hot plates 20 are electrically heated and their temperature is controlled by a timer mechanism. During operation the hot plates are preheated to a temperature slightly above the softening temperature of the polymer from which the molded coupler or fibers are constructed. The hot plates 20 are configured and dimensioned to engage with the end of the positioning fixture 10, wherein the optical coupler with connectors is immobilized. The hot plates 20 may be made of metal and laminated with a material such as silica wafer so as to provide the plates 20 with a polished, and mirror finish surface. The hot plates are suspended by the pistons and are separated from the platform 17 by a space.

To terminate the fibers, a coupler is immobilized in the positioning fixture 10 by securing the body of a coupler element, such as coupler 15, at the center of the positioning fixture 10, so that the ends of the fibers extend slightly beyond the platform 17. In order to ensure that the length of the fibers is constant after termination, a spacer guide is provided at the end of the platform 17. The cover is closed and secured with the clamp, locking the coupler in place, as the power of the apparatus would not go on if the cover is in the open position. The pressurized air cylinders 22 are activated by an electrical control system, such as a solonoid valve which regulates the movement of the pistons, which moves the pistons with the heated plates 20 horizontally in the direction so that the heated plates with light pressure contact the optical fiber ends of a coupler engaged in the positioning fixture 10. The hot plates remain in contact with the fibers for a preset time, typically 2–5 seconds, then, the heaters are turned off and allowed to cool to about 200° below the softening temperature of the polymer. Cooling may be assisted by directing a stream of air or nitrogen gas against the heating elements. If the heaters are not allowed to cool, the softened polymer may adhere to the surfaces of the plates when the pistons are retracted, and the desired shiny surface will not be obtained. After a second preset time, typically 30–50 seconds, the solonoid valve of the air cylinders 22 is deenergized, and the hot plates are retracted by the outward movement of the pistons from the fibers, and the coupler or fibers may be removed from the apparatus. The fibers ends of the coupler are heat-terminated in a single step and left with a smooth, mirror-like surface.

The invention also provides a novel cladding material which is used to coat the polymer optical fibers and optical coupler elements. The cladding layer so provided is of lower refractive index than that of the material used to produce the molded optical coupler or fiber and promotes effective waveguiding by protecting the device against light loss.

Commercially available cladding materials such as ultraviolet-curable resins are designed for use with glass fibers and are difficult to apply to plastic couplers without degrading their performance, when such commercially available cladding materials are used on polymer optical elements such as those made from polycarbonate they often result in performance degradation of the plastic couplers and fibers, due to the solvents used to dissolve the resins. Most solvents with the exception of water and hexane, upon contacting polycarbonate, induce the polycarbonate to undergo surface matting (hazing or loss of transparency). The present invention avoids this problem and provides a water-based polyurethane-acrylic emulsion suitable, particularly for cladding polycarbonate optical couplers and fibers, which has excellent compatibility with and has a lower index of refraction than polycarbonate.

The cladding material of the invention is a nonhazardous, water-based polyacrylic emulsion such as that sold under the registered name Polycrylic® Protective Finish-Clear Gloss, by Minwax, Co. (Little Falls, N.J.), for use as a wood finishing material. The Polycrylic® solution is composed of a polyurethane polymer and an acrylic copolymer as solids dissolved in a water-based solution containing dipropylene glycol methyl ether (100 ppm), ethylene glycol (50 ppm), n-methyl-2-pyrrolidone (100 ppm), ethylene glycol butyl ether (25 ppm) and traces of propylene glycol butyl ether and dipropylene glycol butyl ether. The Polycrylic® emulsion has a melting point of 0° C., boiling point of 100° C. and specific gravity of 1.02. When the Polycrylic® is applied to polycarbonate, by, e.g., dip-coating, spraying (with or without spinning) or brushing, it adheres well and gives the optical coupler or fiber a clear, smooth finish upon drying. The Polycrylic® cladding when applied does not damage or degrade the performance of the coupler or fibers.

The Polycrylic® cladding material is a clear, non-yellowing plastic, which is an alternative and superior to polyurethane. Polycrylic® has a refractive index of approximately 1.512 when it is dried and cured, and thus, a polycarbonate coupler coated with this material has a numerical aperture of 0.47–0.49, which matches the refractive index of, for example, a commercially available clad PMMA fiber.

The Polycrylic® cladding provides a polycarbonate coupler with the difference in refractive index that allows total internal reflection of light through the core without affecting the numerical aperture, of the branching device, and ideally matching the fibers connected to the coupler.

EXAMPLE 1

Couplers with Connectors

This experiment was performed using computer ray-tracing simulations to analyze and assess the performance of 7×7 star couplers with short input and output ports outfitted with the connectors of the invention. Two versions of the coupler were simulated, one with cylindrical ports, the other with square cross-section ports with a transition to a circular cross-section at the extremities, and the bores of the connecting blocks for holding the fibers were configured and dimensioned to accommodate the corresponding fibers. The simulated test results were as follows:

|  | Cylindrical Ports | Square Ports |
| --- | --- | --- |
| Source in air |  |  |
| Excess Loss (dB): | 0.92 | 0.43 |
| Uniformity (dB): | 0.64 | 0.80 |
| Power out (%): | 81.0 | 90.6 |
| Area ratios (%): | 81.0 | 92.1 |

The first model (cylindrical) showed a strong correlation between the output power and the ratio of the ports' total cross-sectional area to the mixing region of the coupler cross-section area. The model visualization confirmed it qualitatively, as most lost rays were being lost through the triangles between the output ports.

The second design (square transition to circular) was an attempt to maximize the above mentioned ratio while keeping roughly the same dimensions for the coupler. One way to reach that goal was to make the ports cross-section a square (total of 7 ports at each end) with a spacing between the ports just big enough to make the wall between the ports strong enough at the location to prevent breaks during molding. The preferred spacing for a 7×7 star coupler between the ports is 0.1 mm and each port having a cross-sectional area of 1 mm, yielded a ratio of:

$$\frac{(7 \times 1mm \times 1mm)}{((7 \times 1mm + 6 \times 0.1mm) \times 1mm)} = 92.1$$

Couplers with connecting blocks having square transition to circular openings show less excess loss than couplers with blocks having bores circular in cross-section. However, the latter type shows better uniformity. The data shows that both types of couplers outfitted with the connecting blocks of the invention may be capable of achieving virtually ideal excess loss and uniformity during performance.

In the following examples, coupler and fiber measurements were made using a test setup from General Fiber Optics, Inc. The test set up consisted of a light pulse sending unit and a receiving unit both of which were interfaced with a personal computer. During a characterization test, a light emitting diode in the sending unit launches 660 nm light pulse wavelength into each of the input fibers. The light intensity emerging from each of the output fibers for a given input is measured by photodiodes in the receiving unit. This information is processed by computer, according to the definitions given below to assess the performance characteristics of the coupler. The light intensity through a low loss polymethylmethacrylate (PMMA) fiber whose length is equal to that of the coupler is taken as the intensity of light launched into each input fiber.

The two most important performance characteristics for a coupler are excess loss and uniformity. Excess loss determines the optical power budget available in a network, while uniformity determines the dynamic range required of the transmitters and receivers. Excess loss is the loss within the non-ideal coupler and is defined for each input i as $$\alpha_{xs,i} = -10 \log \frac{\sum_{j=1}^{N} P_{ij}}{P_0}$$

where $P_{ij}$ is the optical power from output port j measured in decibels (dB) and $P_0$ is the input power. An acceptable excess loss value of a coupler connector is 3 dB. The ideal excess loss is 0 dB. Insertion loss is comprised of splitting loss and excess loss and is between input i and output j, and defined by the formula $$\alpha_{ij} = -10 \log \frac{P_{ij}}{P_0}$$

Splitting loss in a star coupler is the decrease in optical power which results from the light which enters the coupler being split into N ports on the output side and is given also in dB.

$$\alpha \text{ split} = -10 \log \frac{1}{N}$$

The ideal uniformity for a coupler is 0 dB loss; however, the target uniformity for a coupler is 1 dB, and is defined as the difference between the maximum and minimum values of insertion loss.

$$U = \alpha_{ij} Max - \alpha_{ij} Min$$

EXAMPLE 2

Light transmission through the connecting blocks of the invention was assessed in these experiments. Eight, 1-meter PMMA fibers of 1 mm diameter from Toray Industries, Inc. (Toray PFU), were cut and the ends connected with AMP, DNP connectors, and terminated by heat-melting in the hot plate apparatus as described above. Transmitted light through the uncut fibers and connectors was measured with a GFO 660 nm LED source and detector.

The connected fibers were cut in half and the two sets of 50 cm length fibers were inserted with a dab of UV-curable epoxy into the 1-mm holes of connecting blocks which had been made by hand. Fibers ends protruded approximately 1-2 mm from the contact sides or coupling surfaces. In this experiment, UV-curable epoxy was used to further assist in immobilizing the optical fibers in the connecting block. After the epoxy is cured, the fiber ends were polished. The two connecting blocks were joined using 4 dowel pins inserted into holes which were drilled into the corners of the connecting blocks, as a method of fastening and immobilizing the connecting blocks so that the opposing optical fibers were in contact with one another and aligned. Transmitted optical power was measured with and without optical gel ($N_1=1.46$, Cargille) between the blocks. The optical gel was used to minimize optical loss at the connection. In the experiments with gel between the blocks, binder clips were used for joining the connecting block and to secure alignment of the fibers. The results from the experiments are summarized in the table below:

TABLE 1

| | Uncut | Joined, air gap | | Joined, gel | |
|---|---|---|---|---|---|
| Fiber | μW[a] | μW[a] | Loss (dB)[b] | μW[a] | Loss (dB)[b] |
| 1 | 520 | 416 | 0.97 | 443 | 0.70 |
| 2 | 546 | 403 | 1.32 | 447 | 0.86 |
| 3 | 541 | 447 | 0.83 | 492 | 0.41 |
| 4 | 518 | 428 | 0.83 | 454 | 0.57 |
| 5 | 542 | 420 | 1.21 | 455 | 0.76 |
| 6 | 503 | 450 | 1.48 | 481 | 0.19 |
| 7 | 552 | 437 | 1.01 | 477 | 0.63 |
| | | | Av. 0.94 ± 0.24 | | Av. 0.59 ± 0.21 |

[a]Power transmitted measured in microwatts.
[b]Light loss measured in decibels.

Excess loss through the connecting blocks due to Fresnel reflections(R) can be theoretically calculated, since the refractive index of a PMMA fiber is 1.5 and the index through air is 1.0, using the following formula:

$$R = \frac{(1.5 - 1.0)^2}{(1.5 + 1.0)^2} = 0.04$$

When the Fresnel reflection, R is 0.04, the transmitted power=0.96.

The total loss is equal to the square of the transmitted power, which is:

Total Loss=(0.96)(0.96)=0.92.

Excess loss, which is equal to the observed loss is the difference between the measurements through the air gap and the gel gap which appears in Table 1 and is:

Observed Loss=0.94–0.59=0.35dB

Since the transmitted power is equal to 0.96 and the observed loss is equal to 0.35, as compared to an ideal loss of 0, the data demonstrate that virtually all the power was transmitted through the connecting blocks, and that the use of an optical gel between connecting blocks reduces excess loss of the connector, yielding observed values as in theory. The value of 0.92 db is in good agreement with commercial simplex or duplex connector. Furthermore, the excess loss can be lowered by the use of optical gel.

EXAMPLE 3

Eight, 1-meter in length, Toray Industries, Inc., PMMA fibers were connected with AMP, DNP connectors and optical power throughput was measured GFO 660 nm LED source and detector.

Fibers were cut in half, the halves from fibers 1–7 were inserted in connector blocks according to the present invention and fastened with a dab of UV-curable epoxy. The protruding fiber ends were trimmed from 3 mm down to 1 mm and terminated using a hot plate terminator apparatus.

Any loose fibers were pushed forward before joining the connecting blocks with 2 binder clips. Transmitted optical power was measured through the connectors with or without optical gel, and the results are summarized in the table below.

TABLE 2

| Fiber | Uncut µW* | Joined, air gap | | Joined, gel | |
|---|---|---|---|---|---|
| | | µW | Loss (dB) | µW | Loss (dB) |
| 1 | 587 | 332 | 2.48 | 365 | 2.06 |
| 2 | 542 | 336 | 2.08 | 359 | 1.79 |
| 3 | 571 | 298 | 2.82 | 298 | 2.82 |
| 4 | 579 | 325 | 2.50 | 348 | 2.21 |
| 5 | 586 | 341 | 2.35 | 335 | 2.43 |
| 6 | 607 | 355 | 2.33 | 355 | 2.33 |
| 7 | 590 | 318 | 2.68 | 355 | 2.21 |
| | | | Av. 2.46 ± 0.22 | | Av. 2.26 ± 0.30 |

The data shows that the connector of the invention with fibers terminated using the hotplate apparatus have low excess loss in an acceptable range even when compared to the DNP connectors.

EXAMPLE 4

Eight, 1-m in length, jacketed Mitsubishi Eska Extra, PMMA fibers were fitted with AMP, DNP connectors and terminated with the hot plate apparatus of the invention. Transmitted optical power over these lengths was measured and the fibers were cut in half. Seven of the fibers were then fitted into a 7-fiber coupler connector of the invention, made by a commercially available stereolythograph apparatus. The fibers fit was snug in the bores of the connecting blocks, and it was necessary to insert fibers 1–3 and 5–7 first, with fiber 4(middle) last. Fiber ends were terminated in a hot plate apparatus and optical throughput was measured, after aligning and joining the two halves by hand. For comparison, the two halves of fiber 8 were connected with AMP, DNP connectors and also terminated with the hot plate apparatus. Light loss through the connectors was measured with a GFO 660 nm LED source and detector and connector loss was calculated using the following equation, wherein P is the power transmitted in microwatts.

$$\text{Connector loss} = -10 \log \frac{(P \text{ after})}{(P \text{ before})}$$

Relatively high connection losses are most likely a combination of loss due to a tendency of the connector to separate and to lateral misalignment of the fibers. The results were as follows:

TABLE 3

| Fiber | P before, µW | P after, µW | $\alpha_c$ dB |
|---|---|---|---|
| 1 | 488 | 281 | 2.4 |
| 2 | 484 | 307 | 2.0 |
| 3 | 548 | 292 | 2.7 |
| 4 | 520 | 253 | 3.1 |
| 5 | 517 | 315 | 2.2 |
| 6 | 458 | 269 | 2.3 |
| 7 | 552 | 296 | 2.7 |
| | Σ3537 | Σ2013 | Ave. $\alpha_c$ = 2.4 |
| 8 | 448 | 342 | 1.2 |

The block connector shows connector insertion loss very close to 1–2 dB, typically seen with the bulky and precision molded AMP, DNP connectors. However, the connectors of the invention have several advantages over the connectors of the art in that they are easy to use, and inexpensive to manufacture.

EXAMPLE 5

Polycarbonate couplers with and without the cladding of the invention were tested in this experiment. Couplers were coated with a single layer of Polycrylic®-Clear Gloss as cladding material. The water/alcohol-based Polyacrylic® product has a low viscosity and dries quickly after it is applied (approximately 15 to 20 minutes at 80°–90° C. or 30–60 minutes at room temperature.) The cladding was applied by dipping the optical element fibers into the cladding emulsion to just above the radius of curvature "bends". The excess coating was allowed to drip off the fibers prior to mounting the element on a shaft of a spinner-runner apparatus. The clad coupler was spun for 2 minutes and dried under an infrared lamp at 80°–90° C. for 15 minutes on each side. Polycarbonate couplers were also coated by placing the emulsion into a glass tank fitted with a stopcock at the bottom. The glass tank was filled to an appropriate level with the cladding solution, and the coupler was placed in the tank and the stopcock opened, allowing the liquid to drain out. The final thickness of the cladding layer could be controlled by the rate of withdrawal of the liquid from the tank. Couplers with and without cladding (cladding applied by the dipping method) yielded measurements as follows:

| | Unclad Coupler | Coupler with Cladding |
|---|---|---|
| Excess loss | 8.1 ± 1.0 dB | 7.6 dB ± 0.8 dB |
| Uniformity | 5.9 dB | 6.8 dB |

Couplers coated using the glass tank method showed a 1.0–1.4 decrease in excess loss, and negligible change in uniformity. Couplers molded from polystyrene showed similar improvement in excess loss when coated with Polycrylic®.

EXAMPLE 6

The following experiments were carried out to compare the effectiveness of cladding material in guiding light by "black bodies" such as jacketing, AMP, DNP connectors, etc. Of the various products/materials tried for polycarbonate couplers, the Polycrylic® yielded the best results. Fujitsu Polycarbonate fibers of approximately 20 cm in length were used. The experiments were carried out in unclad fibers (Sample 1), fibers as received (Sample 2), and fibers whose cladding had been stripped as in Sample 1, and recoated with Polycrylic® cladding.

Sample 1: Unclad Fujitsu fibers—to remove factory cladding, fibers were immersed in petroleum ether, in a 25 ml graduated cylinder and sonicated until all the cladding was removed and resonicated in fresh ether.

Sample 2: Clad Fujitsu fibers—factory clad

Sample 3: Unclad Fujitsu fibers and recoated with 2 coats of Polycrylic® clad by the Dip-tank method described in Example 5.

Measurements of the optical fibers light output were made using various microscope objectives which were used to focus the light beam coming into the fiber starting with apertures of 0.25 NA at the input, output and middle of fiber during testing. The higher the numerical aperture of the objective, the higher the angle, the higher the number of bounces, and the greater the differences seen while measuring. First readings were taken using the 0.25 NA objective. Light from an LED was launched into each fiber and the output intensity was measured as pieces of black tape (1 cm wide) were pressed in contact with fibers. The results of these experiments are shown below. Measurements of light loss are indicated in dB. TO denotes output transmitted and is measured in milliamperes (mA). NC denotes no change in the transmitted power.

Readings using 0.25 NA objective:
Unclad Fiber
Tape placed in position A (middle of fiber) of sample. 3 trials were run and results were as follows:
50% readings indicate the tape cover half of the fibers.
100% readings indicate the tape wraps around the fiber.

$A_1$  50% 538 mA = 0.33 dB
       100% 430 mA = 1.31 dB
       Tape removed = 614 mA
$A_2$  Start 614 mA
       50% 554 mA = 0.45 dB
       100% 400 mA = 1.86 dB
       Tape removed = 624 mA
$A_3$  Start 624 mA
       50% 567 mA = 0.42 dB
       100% 380 mA = 2.15 dB Tape Locations
1. Unclad Fiber

| A (middle) | B (output end) | C (input end) |
|---|---|---|
| Start 624 mA | Start 377 mA | Start 252 mA |
| 50% 567 mA = 0.42 dB | 50% 340 mA = 0.45 dB | 50% 243 mA = 0.11 dB |
| 100% 380 mA = 2.15 dB | 100% 254 mA = 1.72 dB | 100% 197 mA = 1.07 dB |
|  | Tape Left in place | Tape Left in place |

Total Losses with all 3 pieces of tape in place:
Start 624 mA
50% 243 mA = 4.10 dB
100% 197 mA = 5.01 dB 2. Fiber with Polycrylic ® Cladding

| A (middle) | B (output end) | C (input end) |
|---|---|---|
| Start 662 mA | Start 677 mA | Start 675 mA |
| 50% 650 mA = 0.08 dB | 50% 675 mA = NC | 50% 680 mA = NC |
| 100% 677 mA = NC | 100% 675 mA = NC | 100% 681 mA = NC |
|  | Left in place | Left in place |

3. Fujitsu fiber with Factory Clad

A (middle)
Start 642 mA
50% 645 mA = NC
100% 615 mA = 0.19 dB loss
Tape removed 655 mA
Start 655 mA
50% 669 mA = NC
100% 665 mA = NC
Readings using 0.50 objective:

Tape Locations
1. Unclad Fiber

| A (middle) | B (output end) | C (input end) |
|---|---|---|
| Start 331 mA | Start 189 mA | Start 114 mA |
| 50% 294 mA = 0.51 dB | 50% 170 mA = 0.46 dB | 50% 105 mA = 0.36 dB |
| 100% 189 mA = 2.43 dB | 100% 114 mA = 2.20 dB | 100% 85 mA = 1.27 dB |
| Tape left in place | Tape left in place |  |

Total Losses with all 3 pieces of tape in place:
Start 331 mA
50% 105 mA = 4.99 dB
100% 85 mA = 5.91 dB 2. Fiber with Polycrylic ® Clad

| A (middle) | B (output end) | C (input end) |
|---|---|---|
| Start 325 mA | Start 327 mA | Start 336 mA |
| 50% 328 mA = NC | 50% 319 mA = 0.11 dB | 50% 338 mA = NC |
| 100% 336 mA = NC | 100% 325 mA = 0.03 dB | 100% 347 mA = NC |
|  | Tape left in place | Tape left in place |

3. Fujitsu Fiber Factory Clad

| A (middle) | B (output end) | C (input end) |
|---|---|---|
| Start 346 mA | Start 348 mA | Start 340 mA |
| 50% 350 mA = NC | 50% 346 mA = NC | 50% 339 mA = NC |

| -continued | | |
|---|---|---|
| 100% 347 mA = NC | 100% 346 mA = NC<br>Tape left in place | 100% 348 mA = NC<br>Tape left in place |

The resolution of above readings was about 0.2 dB.

The results show that a piece of black adhesive tape which contacted an unclad fiber produced a 2.2 dB loss in transmitted intensity. Attachment of a second and third piece of tape to the unclad fiber resulted in incremental losses of 1.7 and 1.1 dB, respectively. Neither the factory fiber nor the coated fiber were affected by contact with black tape.

The above data shows that polycarbonate fibers coated with Polycrylic® clad are virtually free of light loss during transmission of light and perform similarly as the factory clad on Fujitsu fiber. In addition, a water-based polyacrylic cladding emulsion would be more advantageous to use as a cladding material, since there is a reduced hazard during handling.

We claim:

1. A clad polycarbonate optical element wherein the cladding is a cured water-based polyacrylic emulsion.

2. A method for cladding a thermoplastic optical coupler element comprising coating the element or fiber with a water-based polyacrylic emulsion by dipping and drying the coated element or fiber.

3. The method of claim 2, wherein the coupler element is made from polycarbonate.

4. The method according to claim 2, wherein said optical element is a fiber.

* * * * *